United States Patent [19]
Chetter

[11] 3,890,196
[45] June 17, 1975

[54] NUCLEAR REACTOR FUEL ELEMENT ASSEMBLY SPACER GRID AND METHOD OF MAKING

[75] Inventor: John Chetter, Lytham-St.-Annes, England

[73] Assignee: United Kingdom Atomic Energy Authority, London, England

[22] Filed: Oct. 11, 1973

[21] Appl. No.: 405,277

Related U.S. Application Data

[63] Continuation of Ser. No. 267,629, June 29, 1972, abandoned.

[30] Foreign Application Priority Data
July 7, 1971 United Kingdom............. 32006/71

[52] U.S. Cl..................... 176/78; 176/76; 29/193.5
[51] Int. Cl............................................ G21c 3/34
[58] Field of Search............ 176/76, 78; 248/54, 56; 29/193.5

[56] References Cited
UNITED STATES PATENTS

| | | | |
|---|---|---|---|
| 3,442,763 | 5/1969 | Chetter et al........................ | 176/78 |
| 3,457,140 | 7/1969 | Glandin............................... | 176/76 |
| 3,654,077 | 4/1972 | Lass et al............................ | 176/78 |
| 3,674,635 | 7/1972 | Anthoney et al. ................. | 176/78 |
| 3,772,148 | 11/1972 | Seddon.............................. | 176/78 |

Primary Examiner—Benjamin R. Padgett
Assistant Examiner—Roger S. Gaither
Attorney, Agent, or Firm—Larson, Taylor and Hinds

[57] ABSTRACT

A cellular fuel element assembly spacer grid providing for resilient bracing of fuel pins in the cells of the grid by bow spring locating members projecting inside the cells of the grid to hold the fuel pins against opposed rigid stops also projecting inside the cells of the grid. The grid comprises two tiers each formed from intersecting strip members defining cells which are penetrated by the fuel pins and arranged parallel to one another but spaced apart. The bow spring locating members extend longitudinally between the two tiers and have end ferrules which are a sliding fit on locating members which extend longitudinally from the facing inner edges of the strip members forming the two tiers. The grid tiers are fabricated individually by heat bonding the intersecting strip members prior to assembling the tiers into the spacer grid.

6 Claims, 4 Drawing Figures

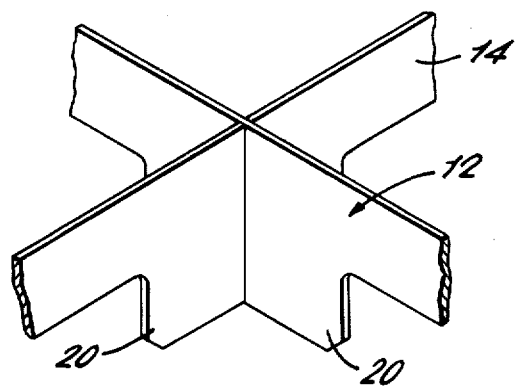
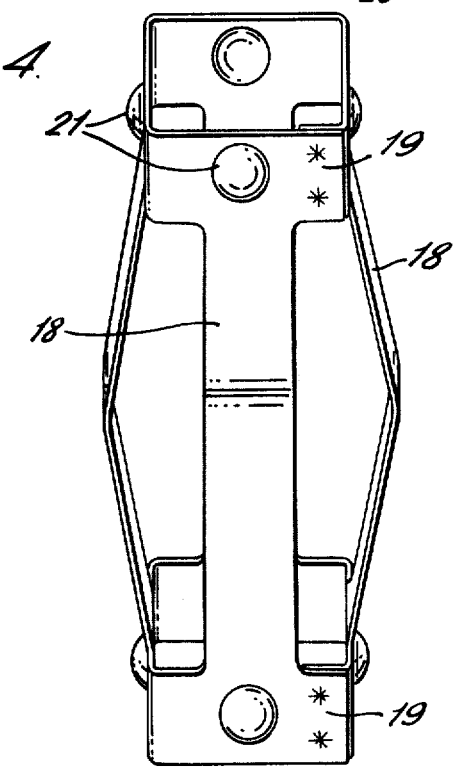
FIG.4
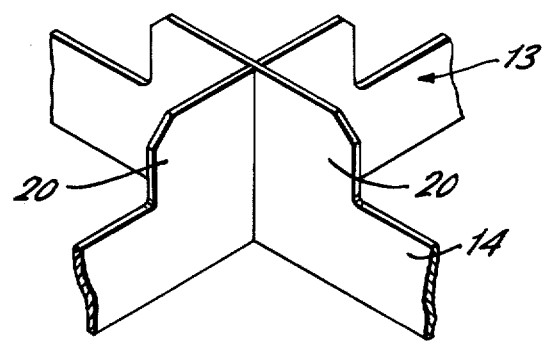

3,890,196

1

NUCLEAR REACTOR FUEL ELEMENT ASSEMBLY SPACER GRID AND METHOD OF MAKING

This is a continuation of application Ser. No. 267,629, filed June 29, 1972, and now abandoned.

BACKGROUND OF THE INVENTION

This invention relates to nuclear reactor fuel element assemblies and methods of making same and in particular to that kind of fuel element assembly including a plurality of elongate fuel pins supported in a bundle with their longitudinal axes parallel. Such a fuel element assembly employs one or more spacer grids disposed intermediate the ends of the assembly and serving to retain the correct lateral location of the fuel pins in the assembly relative to one another. Such grids typically comprise a group of cells each for penetration by a fuel pin and are usually fabricated from thin strip material or thin walled tubes such as stainless steel in an attempt to minimize restriction to reactor coolant flow which is axially through the bundle between the fuel pins.

The invention relates particularly to the form of spacer grid which provides for resilient bracing of the fuel pins in the cells of the grid, for example by spring locating members projecting inside the cells of the grid to hold the fuel pins against opposed rigid projections or stops also projecting inside the cells of the grid.

One such spacer grid, hereinafter referred to as of the type described, comprises two tiers, each tier being formed from intersecting strip members defining cells which are penetrated by the fuel pins. The two tiers of the spacer grid are arranged parallel to one another and spaced apart, the fuel pins of the fuel assembly extending through corresponding cells in the two tiers. In this kind of spacer grid the spring locating members for the fuel pins may be in the form of bow springs extending longitudinally between corresponding cells in the two tiers of the grid to hold the fuel pins against rigid stops projecting inside the cells from the strip members forming the two tiers of the grid.

It is an object of the present invention to provide an improved form of bow spring locating member for the fuel pins in a spacer grid of the kind described. In particular, the improvement relates to the manner in which the bow spring is supported and located between the two tiers of the spacer grid.

SUMMARY OF THE INVENTION

According to the present invention in a spacer grid of the kind described bow spring locating members extending longitudinally between the two tiers of the spacer grid have end ferrules which are a sliding fit on locating members which extend longitudinally from the facing inner edges of the strip members forming the two tiers of the grid.

Preferably the bow spring locating members of a number of adjacent cells in the spacer grid are connected to common end ferrules. For instance the two bow spring locating members of adjacent pairs of cells in the spacer grid may be connected to common end ferrules. In this case the end ferrules may be of flattened tubular form and the locating members for the end ferrules may be in the form of tongues extending longitudinally from the facing inner edges of the strip members forming the two grid tiers.

2

Another arrangement is applicable in a spacer grid having cells of rectangular form and in which the bow spring locating members extend diagonally inwards from one corner of each cell. In this case the bow spring locating members of groups of four adjacent cells are positioned at the corresponding adjacent corners of the four cells of each group. The four bow spring locating members of each group of four adjacent cells are connected with common end ferrules. The end ferrules may be box-shaped and the locating members for the end ferrules may again be in the form of tongues extending longitudinally from the facing inner edges of the strip members of the two grid tiers. Pairs of the tongues are positioned forming a cross at the points of intersection of the strip members in the two grid tiers. Where the end ferrules of the bow spring locating members are box-shaped the cross pairs of tongues extend across the ferrules diagonally.

DESCRIPTION OF THE DRAWINGS

Two embodiments of the invention will now be described by way of example with reference to the accompanying drawings in which FIG. 4 is an isometric detail, in "exploded" form, of the spacer grid shown in FIG. 3.

DESCRIPTION OF THE PREFERRED EMBODIMENTS

Figure 1:
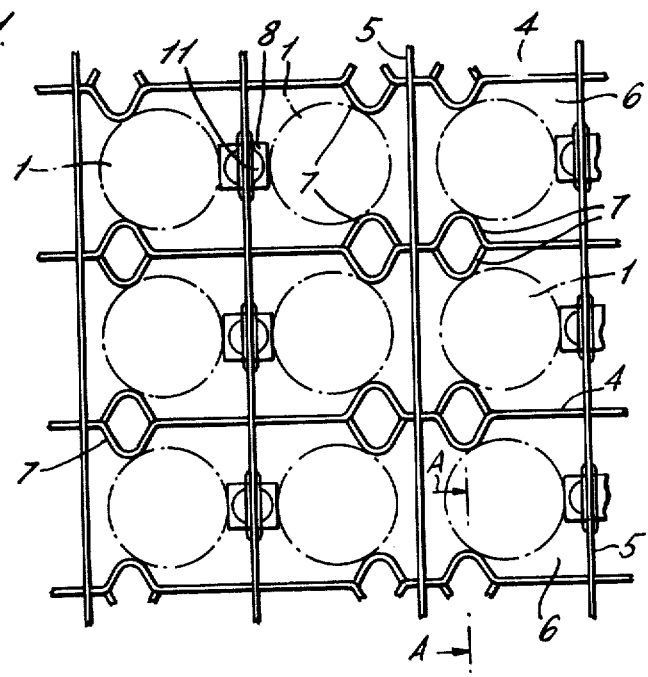
FIG. 1 is a cross sectional elevation of part of a nuclear reactor fuel element assembly including one form of spacer grid in accordance with the invention.
Figure 2:
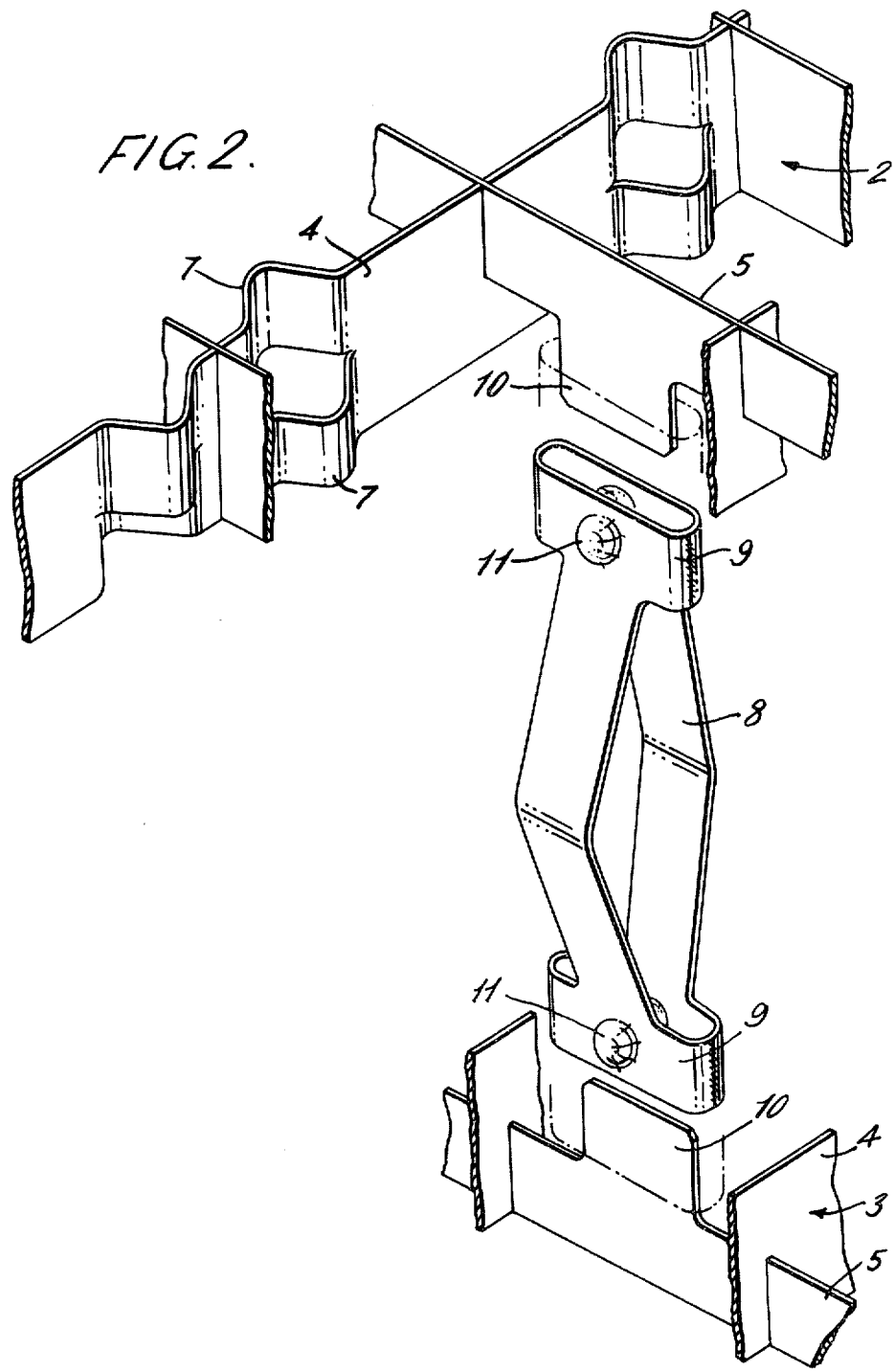
FIG. 2 is an isometric detail, in "exploded" form, of the spacer grid shown in FIG. 1.

FIG. 1 of the drawings shows part of a nuclear reactor fuel element assembly comprising a plurality of cylindrical fuel pins 1 arranged with their longitudinal axes parallel. The fuel pins 1 are spaced apart and transversely located at points intermediate their ends by spacer grids, one of which is shown in FIGS. 1 and 2. The spacer grid comprises upper and lower grid tiers 2 and 3 which are spaced longitudinally apart within an outer band (not shown). The grid tiers 2 and 3 are each formed from intersecting strip members 4 and 5 defining cells 6 in the grid tiers 2 and 3 of square cross-section. The fuel pins 1 extend through corresponding cells 6 in the upper and lower grid tiers 2 and 3. The strip members 4 running in the one direction across the grid tiers 2 and 3 are dimpled to form rigid locating stops 7 for the fuel pins 1 in the cells 6 of the upper and lower grid tiers 2 and 3. The cells 6 each have two stops 7 extending inwardly from the opposite sides of the cells 6 defined by the strip members 4 in the upper and lower grid tiers 2 and 3. The fuel pins 1 are held against the stops 7 in the cells 6 by bow springs 8 extending between the upper and lower grid tiers 2 and 3. The bow springs 8 extend between the facing inner edges of alternate strip members 5 which run transversely to the dimpled strip members 4 in the upper and lower grid tiers 2 and 3. The bow springs 8 are located in oppositely acting pairs between adjacent fuel pins 1 in the fuel element assembly. The bow springs 8 in each pair are connected at their ends by ferrules 9 which are of flattened tubular form. The ferrules 9 joining the ends of the pairs of bow springs 8 are a sliding fit on tongues 10 extending longitudinally from the facing inner edges of the plain strip members 5 in the upper and lower grid tiers 2 and 3. The end ferrules 9 of each pair of bow springs 8 are formed with dimple shaped back stops 11 which limit the degree of freedom of movement of the fuel pins 1 away from the stops 7 in the cells 6 against the resilient action of the bow springs 8.

The grid tiers 2 and 3 are fabricated from a material compatible with the operating conditions in the reactor, for example stainless steel, or where neutron economy is required of a material having a low neutron absorption cross-section, such as zircaloy. All points of intersection of the strip members 4 and 5 in the grid tiers 2 and 3 are brazed or welded. The bow springs 8 are fabricated from a material having the required spring characteristics, such as stainless steel, inconel or nimonic alloys.

The method of retaining the bow springs 8 in the spacer grid allows for the grid tiers 2 and 3 to be built up and brazed or welded before the bow springs 8 are added and the grid tiers are assembled within the outer band of the spacer grid. This method of construction avoids the possibility of the material characteristics of the bow springs 8 being changed due to the heat applied during welding or brazing operations on the grid tiers 2 and 3.

As shown in chain dotted outline with respect to the lower grid tier 3 in FIG. 2 the end ferrules 9 of the bow springs 8 may fit on the tongues 10 without longitudinal clearance with the strip members 5 of the grid tiers 2 and 3. In this case the bow springs 8 are held firmly so as to provide an "encastre" effect at the spring ends. A different spring characteristic may be obtained if as shown in chain dotted outline with respect to the upper grid tier 2 in FIG. 2, a longitudinal clearance is provided between the end ferrules 9 and the strip members 5 of the grid tiers 2 and 3. This enables the ferrules 9 of the bow springs 8 to move outwards on the tongues 10 giving a "free" effect to the spring ends.

Figure 3:
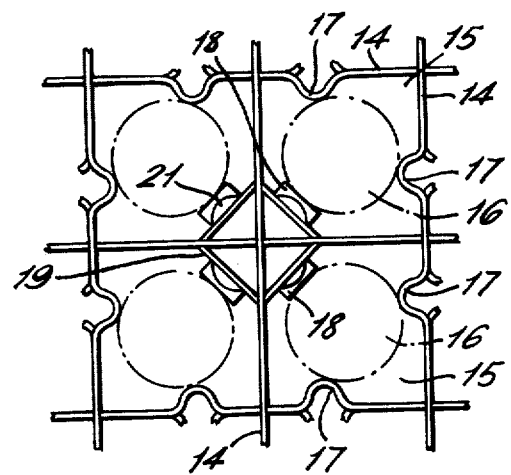
FIG. 3 is a cross sectional elevation of part of a nuclear fuel element assembly including a second form of spacer grid in accordance with the invention.

An alternative form of spacer grid is shown in FIGS. 3 and 4 of the drawings. This spacer grid comprises upper and lower grid tiers 12 and 13 which are also spaced longitudinally apart within an outer band (again not shown). The grid tiers 12 and 13 are each formed from intersecting strip members 14 defining cells 15 in the grid tiers 12 and 13 of square cross section. Fuel pins 16 extend through corresponding cells 15 in the upper and lower grid tiers 12 and 13. Alternate strip members 14 forming the grid tiers 12 and 13 are dimpled to form rigid locating stops 17 for the fuel pins 16 in the cells 15 of the upper and lower grid tiers 12 and 13. The cells 15 in both the upper and lower grid tiers 12 and 13 each have two stops 17 extending inwardly from adjacent sides of the cells 15. The fuel pins 16 are held against the stops 17 in the cells 15 by bow springs 18 extending between the upper and lower grid tiers 12 and 13. The bow springs 18 extend between the facing inner edges of the strip members 14 of the upper and lower grid tiers 12 and 13 at the corners of corresponding cells 15 in the grid tiers 12 and 13 diagonally opposite to the stops 17 in the cells 15. The cells 15 in the upper and lower grid tiers 12 and 13 are associated in groups of four with the four bow springs 18 of each group of four cells 15 located at the adjacent corners of the group of cells 15. The four associated bow springs 18 are connected at their ends by box shaped ferrules 19. The ferrules 19 are a sliding fit on crossed tongues 20 which extend longitudinally from the facing inner edges of the strip members 14 of the upper and lower grid tiers 12 and 13 at the corresponding points of intersection of the strip members 14. The tongues 20 extend across the diagonals of the ferrules 19 of the bow springs 18. A dimple shaped back stop 21 is formed on each of the four faces of the ferrules 19. The back stops 21 limit the degree of freedom of movement of the fuel pins 16 away from the stops 17 in the cells 15 against the resilient action of the bow springs 18.

I claim:

1. A spacer grid for a nuclear reactor fuel assembly of the kind including a plurality of elongate fuel pins supported in a bundle with their axes parallel, said spacer grid comprising two spaced apart grid tiers each tier including a plurality of intersecting strip members defining a number of openings, the openings in one tier being coincident with those in the other tier, projections extending from mutually adjacent faces of the tiers to project into the space between the tiers, resilient members having ferrule shaped ends engaging said projections and resilient portions between said ends protruding into the space between said grid tiers so as to resiliently engage fuel pins penetrating coincident openings, the ferrules being constructed and arranged so as to be engageable with said projections after individual assembly of the grid tiers, said intersecting strip members being heat bonded to one another for assembly of the grid tiers.

2. A spacer grid as claimed in claim 1 wherein said resilient members of a number of adjacent openings are connected to common end ferrules.

3. A spacer grid as claimed in claim 2 wherein the two resilient members of adjacent pairs of openings are connected to common end ferrules of flattened tubular form and said projections for the end ferrules are in the form of tongues.

4. A spacer grid as claimed in claim 1 wherein said openings are of rectangular form, said resilient members extend diagonally inwards from one corner of each opening and said resilient members of groups of four adjacent openings are connected with common end ferrules.

5. A spacer grid as claimed in claim 1 wherein said ferrules are box-shaped and projections for the end ferrules are in the form of tongues positioned in pairs extending across the ferrules diagonally to form a cross at the points of intersection of the strip members of said two tiers.

6. A method of making a spacer grid for a nuclear reactor fuel assembly of the kind including a plurality of elongate fuel pins supported in a bundle with their axes parallel, the spacer grid comprising two spaced apart grid tiers comprising a plurality of intersecting strip members defining a number of openings, the openings in one tier being coincident with those in the other tier, and resilient members extending between said grid tiers and having a resilient portion protruding into the space between said grid tiers so as to resiliently engage fuel pins penetrating coincident openings, said method comprising the steps of assembling each individual grid tier by fusion bonding of said intersecting strip members, and subsequently providing said resilient members therebetween, whereby the resilient characteristics of the resilient members are not affected by the heat involved in said fusion bonding of said intersecting strip members.

* * * * *